United States Patent Office 3,469,172
Patented Sept. 23, 1969

3,469,172
CIRCUIT DEVICES FOR CONVERTING A DIRECT CURRENT VOLTAGE INTO A STEPPED ALTERNATING CURRENT VOLTAGE
Gunnar A. Kihlberg, Sollentuna, Sweden, assignor to Jungner Instrument Aktiebolag, Stockholm, Sweden
Filed Nov. 4, 1965, Ser. No. 506,302
Claims priority, application Sweden, Nov. 16, 1964, 13,767
Int. Cl. H02m 1/12
U.S. Cl. 321—9    13 Claims

ABSTRACT OF THE DISCLOSURE

A method and circuit for converting a direct current voltage into an alternating current voltage having a stepped envelope approximating a sinusoidal waveform, in which an input voltage vector of the direct current voltage is converted to two voltage components having a phase difference of 90°, as by a transformer with three input and three output taps, including a center tapped primary winding and a tapped secondary winding, alternately and at a predetermined frequency algebraically combining the argument of the input voltage vector and a predetermined argument by adding the two to one another, subtracting the argument of the input voltage vector from the predetermined argument or subtracting the predetermined argument from the argument of the input voltage vector, as by alternately switching a single pole, two-way switch at a predetermined frequency, to produce two orthogonal output voltage components whose output voltage vector has a step-wise varying argument, and repeating this procedure on the output voltage vector at a different switching frequency than the preceding frequency. Normally the frequency is controlled by a master oscillator having a frequency twice the highest frequency of the first switch and each successive switch is gated to have a frequency of half the frequency of the previous switch.

---

The present invention relates to D.C./A.C. converters and, more specifically, to a circuit device for converting a D.C. voltage into a stepped A.C. voltage which, in relation to the number of steps, provides an optimum of approximation to a sinusoidal A.C. voltage. It is mainly characterized by at least two networks connected in cascade and each comprising two inputs, two outputs, voltage-transforming means, and a two-way switch, means for supplying to said two inputs two voltage components having a mutual phase difference of 90° and derived from an input voltage vector having a predetermined argument, aid two outputs being arranged to deliver two components of an output voltage vector the argument of which being, in response to whether said switch is in the one or the other of its two operational positions, superior or inferior to the argument of said input voltage vector, means for supplying said two output voltage vector components to the succeeding network of the cascade, and the switches of the individual cascaded circuits being designed for operation of different switching frequencies.

Apparatus for converting a D.C. voltage into a sinusoidal A.C. voltage are previously known. Also converters adapted to approximate the sinusoidal wave by means of a stepped waveform are known before. A drawback frequently involved in these old converters resides in that they require one change-over switch per level of the stepped voltage so that the number of components will be great. Further, the switches generally will be subjected to high voltage surges at the switching moments whereby the stressing of the same as well as the switching losses will be unreasonably high. In the apparatus according to the present invention, the number of levels of the stepped voltage will be doubled for each additional switch included, thereby providing for a very close sinusoidal waveform approximation by the use of a reasonable number of switches. The latter do operate when the voltage across each of them has its lowest value. A further advantage of this converter resides in that no more than one switch operates at a time.

According to one embodiment of the invention each of the cascaded networks is a six-pole having three input and three output terminals and comprising as its active converter element a transformer with a center-tapped primary winding and a tapped secondary winding, serving as a resolver means for forming two orthogonal components from the input voltages. In that case the secondary tap is disposed so that in all the six-terminal networks, except those carrying numbers 1 and 2 in the order of succession, the turns ratio of one half of the primary winding to the two portions of the secondary winding will be $$1 : \cot \pi/2^p \cdot \tan \pi/2^{p+1} : \tan \pi/2^p \cdot \tan \pi/2^{p+1}$$

$p$ indicating the number of the six-terminal network in the order of succession. The first input terminal of each network is connected through a single-pole two-way switch (or chopper) alternatively to one or the other end terminal of the primary winding. The second input terminal is connected to the center tap of the primary winding and to the third output terminal, while the first output terminal and the second output terminal are connected to individual end terminals, respectively, of the secondary winding. The first output terminal is connected to the end terminal of that portion of the transformer secondary winding which has a number of turns equal to $\cot \pi/2^p \cdot \tan \pi/2^{p+1}$ relative to that of one half of the primary winding. The switch (or chopper) of each six-terminal network is arranged to change over periodically in accordance with the function sgn (sign for or plus or minus 1) $\cos 2^p \omega t$.

In the six-terminal network numbered 1, the secondary winding of the transformer has no intermediate tap and has an arbitrary number of turns, as determined only by the value of the output voltage desired. In the six terminal network numbered 2, also the transformer secondary has no intermediate tap. This winding has a number of turns equal to $\cot \pi/4 \cdot \tan \pi/8 = \tan \pi/8$ relative to that of one half of the primary winding. One end terminal of this winding constitutes the second input terminal of the six-terminal network.

The connection between the six-terminal networks is so arranged that, out of the input terminals of the network serially, numbered $p$, the first one is connected to the first input terminal of the next-succeeding six-terminal network, which is numbered $p-1$, the second one to the second input terminal of the next-succeeding network, etc.

The end terminals of the secondary winding in the six-terminal network serially numbered 1 constitute output terminals for the entire converter. The first and second input terminals of the six-terminal network carrying the highest serial number are mutually short-circuited and constitute one of the two input terminals of the converter, the third input terminal of the same six-terminal network constituting the second input terminal of the entire converter.

The invention will now be described in greater detail with reference to the accompanying drawings, in which:

FIGURE 3 shows two cascade connected six-terminal networks of the same type as that of FIGURE 2, while

Figure 1:
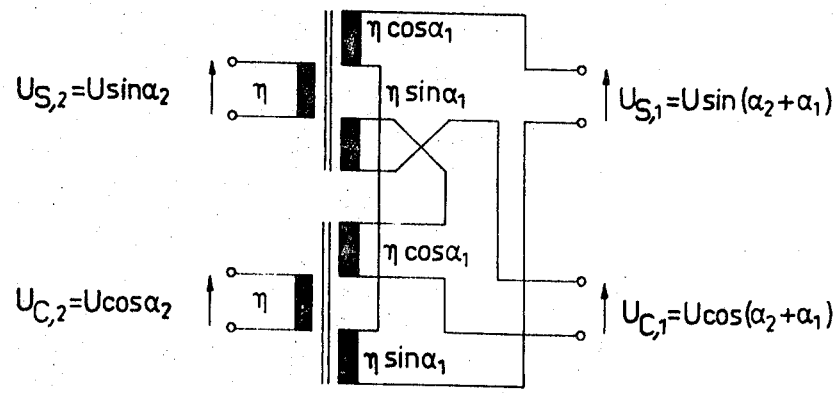
FIGURE 1 shows an apparatus adapted to add a phase angle to a two-phase voltage.
Figure 2:
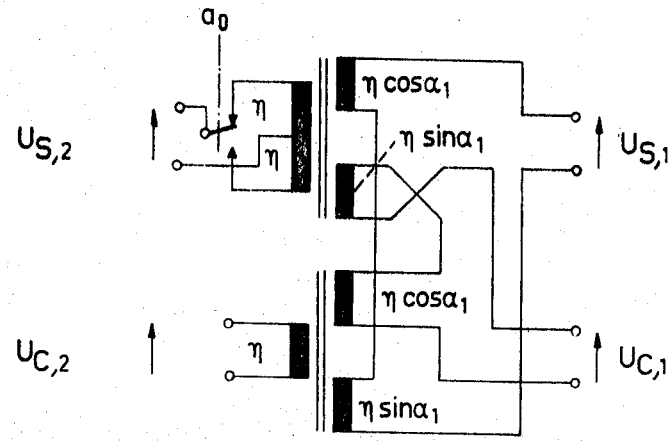
FIGURE 2 shows the same apparatus, but enabling the polarity of one input voltage to be changed.
Figure 3:
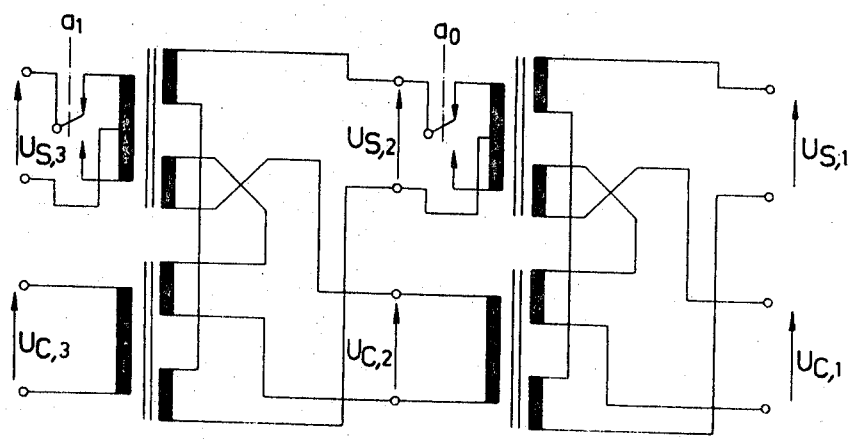

By means of the circuitry of FIGURE 1 it is possible to shift the phases of two relatively orthogonally phase-displaced A.C. voltages $U_{s,2}$ and $U_{c,2}$ having equal peak values $U$, by any selected angle $\alpha$. In this case:

$U_{s,2} = U \sin \alpha_2$
$U_{c,2} = U \cos \alpha_2$
$U_{s,1} = U \sin (\alpha_2 + \alpha_1)$
$U_{c,1} = U \cos (\alpha_2 + \alpha_1)$ If the polarity of $U_{s,2}$ is changed periodically according to the function $a_0 = $ sgn (sign for or plus or minus 1) cos $\omega t$, then the output voltages will be:

$U_{s,1} = U \sin (\alpha_1 + a_0 \cdot \alpha_2)$
$U_{c,1} = U \cos (\alpha_1 + a_0 \cdot \alpha_2)$ This can be accomplished by the circuitry of FIGURE 2. If one further six-terminal network is connected to the left-hand side of that shown in FIGURE 2, thereby obtaining the circuitry of FIGURE 3, but using a switch controlled by the function $a_1 = $ sgn cos $2\omega t$, and referencing the input voltages as $U_{s,3} = U \sin \alpha_3$
$U_{c,3} = U \cos \alpha_3$ then the output voltage will be:

$U_{s,1} = U \sin (a_0 a_1 \alpha_3 + a_0 \alpha_2 + \alpha_1) = U \sin \varphi_1$
$U_{c,1} = U \cos (a_0 a_1 \alpha_3 + a_0 \alpha_2 + \alpha_1) = U \cos \varphi_1$ Using a chain comprising $q$ six-terminal networks and in which the changeover switch of any network $p$ is controlled according to the function $a_{p-1} = $ sign (sign for or plus or minus 1) cos $2^{p-1}\omega t \cdot (p=1 \ldots q)$, and the argument added by network $p$ is ($p=1, 2 \ldots q+1$), the output voltages will be:

$$U_{s,0} = U \sin \left( \alpha_{q+1} \cdot \prod_{p=0}^{q-1} a_p + \ldots a_0 a_1 \alpha_3 + a_0 \alpha_2 + \alpha_1 \right)$$

$$U_{c,0} = U \cos \left( \alpha_{q+1} \cdot \prod_{p=0}^{q-1} a_p + \ldots a_0 a_1 \alpha_3 + a_0 \alpha_2 + \alpha_1 \right)$$

(1)

Figure 4:
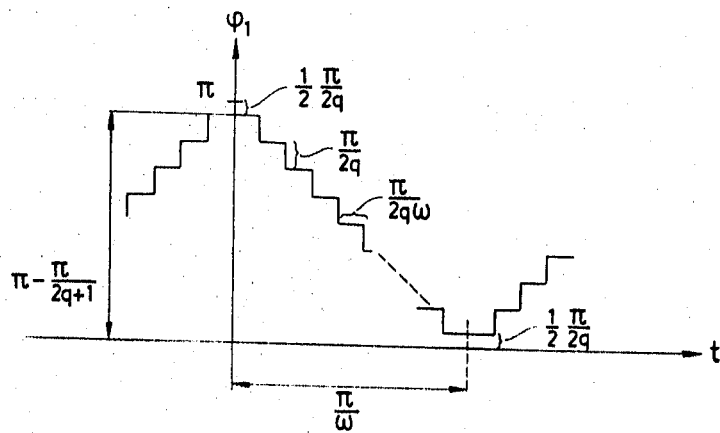
FIGURE 4 illustrates how the argument of the vector representing the output voltages of an arrangement comprising two cascade connected six-terminal networks will vary vs. time.

If $\alpha_p = \pi/2^p$, then the argument $\varphi_1$ in the expressions for $U_{s,1}$ will have the development in time as shown in FIGURE 4. The magnitude $\alpha_{q+1}$ is the argument of the vector representing the input voltages.

Multiplying the argument $\varphi_1$ by $b_0 = $ sgn (sign for or plus or minus 1) sin $\omega t$ and adding the angle $\pi$ thereto will give $$\varphi_0 = \alpha_{q+1} \cdot b_0 \cdot \prod_{p=0}^{q+1} a_p + \ldots + b_0 a_0 a_1 \alpha_3 + b_0 a_0 \alpha_2 + b_0 \alpha_1 + \pi$$

where $b_p = $ sgn (sign for or plus or minus 1) sin $2^p \omega t$. For $a$- and $b$-functions the following general statements are true:

$$b_p \cdot b_{p+1} = a_p \quad (2)$$
$$b^2_p = a^2_p = |b_p| = |a_p| = 1 \quad (3)$$

Thus, $\varphi_0$ can now be written:

$\varphi_0 = b_q \alpha_{q+1} + b_{q-1} \cdot \alpha_q + \ldots + b_1 \alpha_2 + b_0 \alpha_1 + \pi$ Considering Equation 1, the following relationship is obtained:

$$\varphi_0 = b_q \frac{\pi}{2^q} + 1 + b_{q-1} \cdot \frac{\pi}{2^q} + \ldots + b_1 \frac{\pi}{4} + b_0 \frac{\pi}{2} + \pi \quad (4)$$

Figure 5:
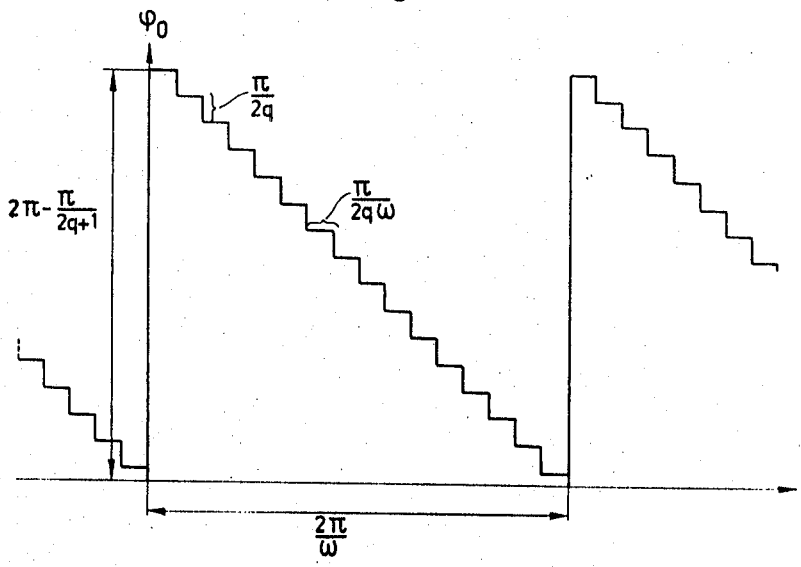
FIGURE 5 illustrates how the argument of the same vector will vary when adding thereto one further six-terminal network of a type which differs from those shown before.

The development in time of this function is illustrated in FIGURE 5.

Figure 6:
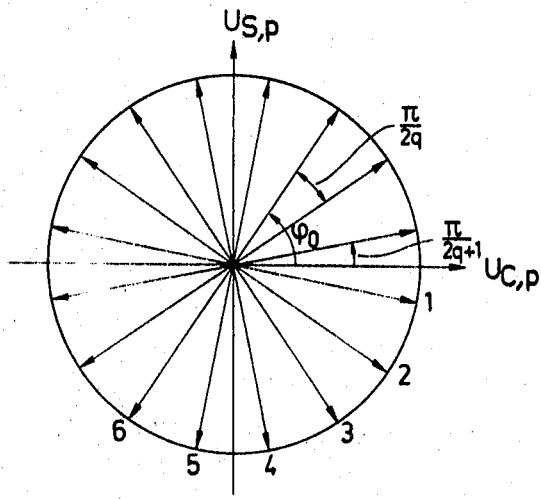
FIGURE 6 is a vector diagram illustrating the output voltages.

Plotting $U_c$ along the horizontal axis and $U_s$ along the vertical axis of a coordinate system, the voltages $U_s$ and $U_c$ can be represented by a vector of the amount $U$ and argument $\varphi_0$. Vector $U_p$ can be written: $U_p = [U_{c,p}; U_{s,p}]$. With the time function of argument $\varphi_0$ as shown in FIGURE 5, the vector will occupy the positions, and the serial order, as shown in FIGURE 6. From this figure and the discussion hereinbefore it is clear that the voltages $U_{c,0}$ and $U_{s,0}$ will constitute a two-phase system in which $U_{c,0}$ and $U_{s,0}$ are optimum approximations to sinusoidal curves.

Figure 7:
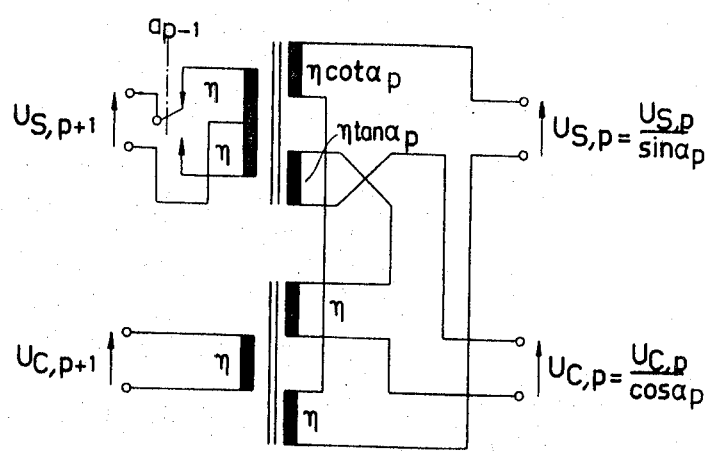
FIGURES 7 and 8 illustrate, how a step-wise modification of a six-terminal network can result in an apparatus containing one single transformer only.

A condition precedent for the function of the arrangement thus far described is that $U_{c,p}$ is a pure A.C. voltage. This condition cannot be satisfied for a D.C.-to-A.C.-converter in which $U_{s,q+1}$ and $U_{c,q+1}$ are to be D.C. currents. Thus, the lower transformers in FIGURES 1, 2 and 3 must be removed. This may be made if, primarily, the turns ratio of the same is made equal to 1:1:1. If in the lower transformer of FIGURE 1 the number of turns of the upper secondary winding is divided by cos $\alpha_1$, and the number of turns of the lower secondary winding is divided by sin $\alpha_1$, then the turns ratio of the primary winding to each of said secondary windings will be 1:1. In this case it will be necessary, however, in order to maintain the proportionality between the partial voltages delivered by the various transformers, also to divide the number of turns of the upper secondary winding of the upper transformer by sin $\alpha_1$, and to divide the number of turns of its lower secondary winding by cos $\alpha_1$. Thus, the turns ratio of the upper transformer will now be 1:cot $\alpha_1$:tan $\alpha_1$, and that of the lower transformer will be 1:1:1, see FIGURE 7. Utilizing the possibility of providing a common reference line for input and output, the circuitry will be that shown in FIGURE 8. Using the same reference symbols as before, the output voltages from a six-terminal network carrying serial number $p$ will now be as follows:

$$U'_{s,p} = \frac{U_{s,p}}{\sin \alpha p}$$

$$U'_{c,p} = \frac{U_{c,p}}{\cos \alpha p}$$

Thus, as a rule, they will no longer have identical amplitudes and wave-shapes, and the vector representing the voltage system $U'_{s,p}$; $U'_{c,p}$ will become different in length in different positions. However, $U'_{s,2}$ and $U'_{c,2}$ will be identical in wave-shape and amplitude, since $\alpha_2 = \pi/4$ and cos $\pi/4 = $ sin $\pi/4$. It is possible, in a chain comprising a plurality of six-terminal networks, to compensate for the deviation from optimum sinusoidal approximation by multiplying the $p$:th transformer turns ratio by tan $\pi/2^{p+1}$, whereby the turns ratios will be:

$$1 : \cot \frac{\pi}{2^p} \cdot \tan \frac{\pi}{2^{p+1}} : \tan \frac{\pi}{2^p} \cdot \tan \frac{\pi}{2^{p+1}}$$

As a consequence, the input voltages of a chain comprising $q$ six-terminal networks will be:

$$U'_{s,q+1} = \frac{U_{s,q+1}}{\sin \frac{\pi}{2^{q+1}}}$$

$$U'_{c,q+1} = \frac{U_{c,q+1}}{\cos \frac{\pi}{2^{q+1}}}$$

According to Equation 4, the input argument before removal of one of the two transformers was $\pi/2^{q+1}$, that is:

$$U_{s,q+1} = U \sin \frac{\pi}{2^{q+1}}$$
$$U_{c,q+1} = U \cos \frac{\pi}{2^{q+1}}$$
from which follows that
$$\begin{cases} U'_{s,q+1} = U \\ U'_{c,q+1} = U \end{cases}$$

Thus, the two input voltages—which may now be D.C. voltages—will be equally high, enabling the use of one single voltage source only. The formula for the transformer turns ratio will not be valid for $p$ less than 2 ($\tan \pi/2 = \cot \pi = \infty$).

Connected after the second six-terminal network are two modified six-terminal networks which have thereby been converted into four-terminal networks and may be described as being single-phase elements where those previously described were two-phase elements. Their change-over switches will be controlled by functions $a_0$=sgn (sign for or plus or minus 1) $\cos \omega t$ and $b_0$=sgn $\sin \omega t$, respectively.

Figure 8:
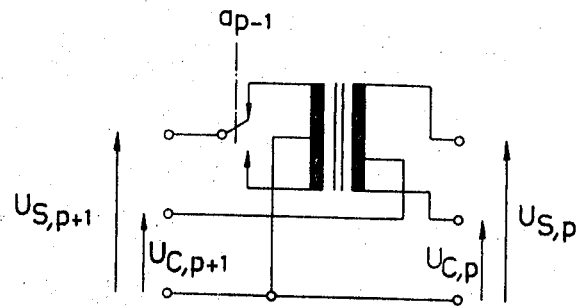
Figure 9:
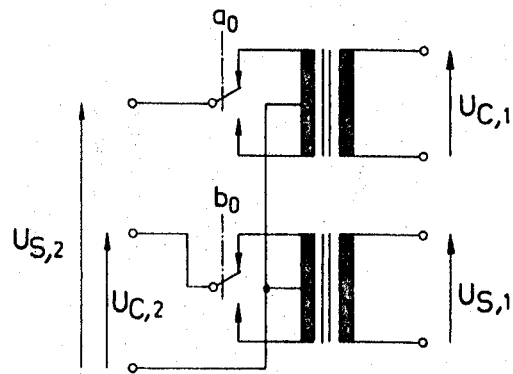
FIGURE 9 shows, how the final links in a chain of six-terminal networks are arranged.
Figure 10:
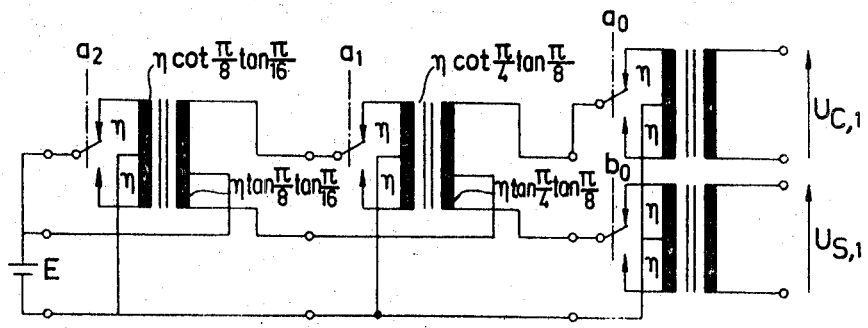
FIGURE 10 illustrates the arrangement of a complete D.C.-to-A.C. voltage converter with a two-phase output circuit.

The transformer turns ratio thereof is arbitrary and may be so selected as to give the output voltage desired. This is shown in FIGURE 8. A complete converter comprising a D.C. voltage source, three six-terminal networks and a two-phase output is shown in FIGURE 10. If a single-phase output only is desired, it is possible to omit one of the last two six-terminal networks shown in FIGURES 9 and 10, as well as the lower transformer winding of six-terminal network 2 in FIGURE 10.

Figure 11:
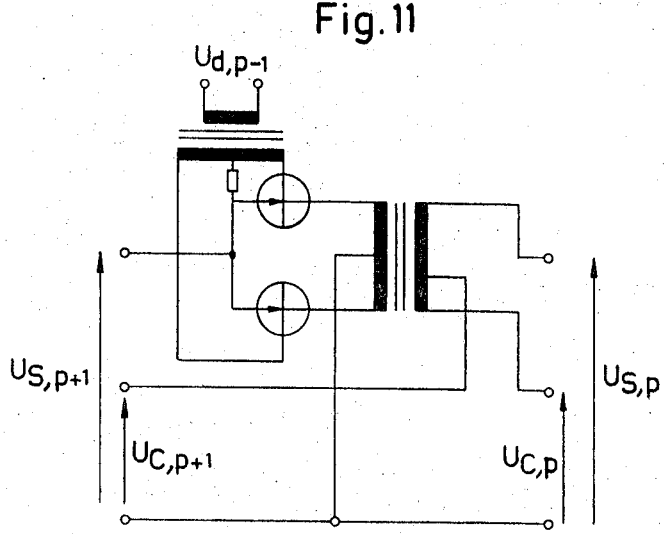
FIGURE 11 illustrates an embodiment of a six-terminal network using transistors.
Figure 12:
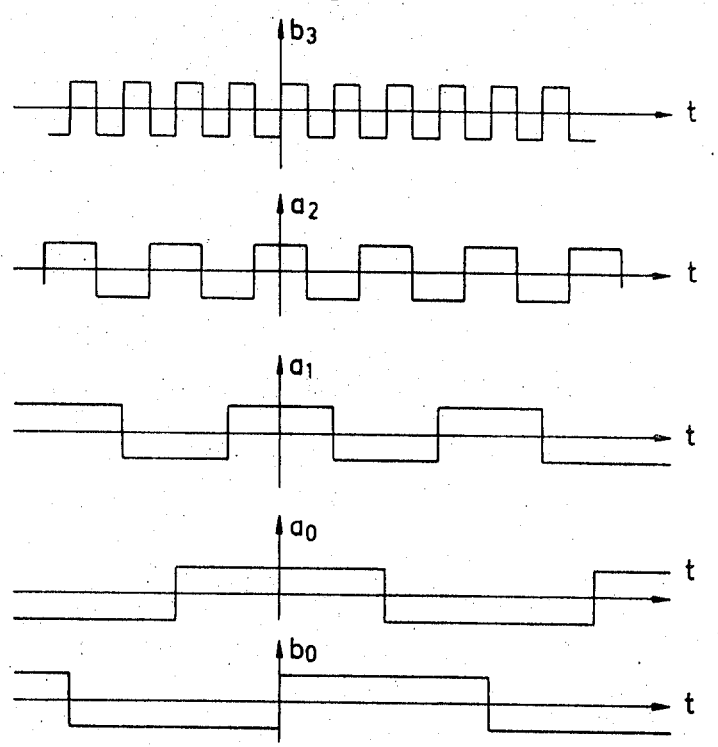
FIGURE 12 illustrates the time functions of the control voltages for the switches of the converter shown in FIGURE 10.

Exactly how the change-over switches are constructed, is of no fundamental importance to the invention. A six-terminal network in which the change-over switch is realized by means of transistors is shown in FIGURE 11, in which $U_d$ is an operating voltage which may be described by the expression: $U_{d,p-1} = \hat{U}$ sgn (sign for or plus or minus 1) $\cos 2^{p-1}\omega t$. Functioning as a master oscillator controlling the entire chain of change-over switches is an oscillator having a frequency according to function $b_q$, that is, twice the highest frequency appearing in the switch chain. Functions $a_p$ and $b_0$ are realized by means of synchronizable oscillators and gates. The techniques of accomplishing this are well-known in the art, and the practical design of these circuits is of no fundamental importance to the inventive idea. The functions $b_3$, $a_2$, $a_1$, $a_0$ and $b_0$ are illustrated in FIGURE 12.

What is claimed is:

1. A circuit for converting a direct current voltage to an alternating current voltage having a stepped envelope approximating a sinusoidal wave form, comprising, at least two serially connected networks having the output of a preceding network connected to the input of the next succeeding network, each of said networks, including, resolver means adapted to form two orthogonal components from a single input voltage vector of said direct current voltage and two-way switch means adapted to alternately and at a predetermined frequency algebraically combine the argument of said input voltage vector and a predetermined argument.

2. A circuit in accordance with claim 1 wherein each successive one of the switch means is adapted to operate at a frequency of half the frequency of the preceding switch means.

3. A circuit in accordance with claim 1 wherein the resolver means is a transformer having a center tapped input and an intermediate tapped output.

4. A circuit in accordance with claim 1 wherein the switch means is a transistor bistable switch means.

5. A circuit in accordance with claim 1 wherein the switch means is a single pole, two-way switch.

6. A circuit in accordance with claim 1 wherein the switch means is adapted to add the argument of the input voltage vector and the predetermined argument.

7. A circuit in accordance with claim 1 wherein the switch means is adapted to subtract the argument of the input voltage vector from the predetermined argument.

8. A circuit in accordance with claim 1 wherein the switch means is adapted to subtract the predetermined argument from the argument of the input voltage vector.

9. A method for converting a direct current voltage to an alternating current voltage having a stepped envelope approximating a sinusoidal wave form, comprising, forming two orthogonal components from an input voltage vector of said direct current voltage, alternately and at a predetermined frequency algebraically combining the argument of said input voltage vector and a predetermined argument to produce two orthogonal voltage components of an output voltage vector with a step-wise varying argument, and at least one repeating the preceding series of operations on the output voltage vector of a previous series of operations.

10. A method in accordance with claim 9 wherein each successive series of operations is carried out at a frequency of adding and subtracting which is half the frequency of the preceding series of operations.

11. A method in accordance with claim 9 wherein the argument of the input voltage vector and the predetermined argument are added.

12. A method in accordance with claim 9 wherein the argument of the input voltage vector is subtracted from the predetermined argument.

13. A method in accordance with claim 9 wherein the predetermined argument is subtracted from the argument of the input voltage vector.

References Cited

UNITED STATES PATENTS

| | | | |
|---|---|---|---|
| 1,691,986 | 11/1928 | Nyquist | 321—9 |
| 2,541,427 | 2/1951 | Lee | 321—49 |
| 2,612,631 | 9/1952 | Distin et al. | 321—49 |
| 3,136,957 | 6/1964 | Putkovich et al. | 331—52 |
| 3,225,209 | 12/1965 | Schuster | 307—80 |

FOREIGN PATENTS 566,100  12/1944  Great Britain.

JOHN F. COUCH, Primary Examiner

G. GOLDBERG, Assistant Examiner

U.S. Cl. X.R.

321—44, 49